(12) United States Patent
Menezes et al.

(10) Patent No.: US 10,379,865 B1
(45) Date of Patent: Aug. 13, 2019

(54) SELECTION OF INSTRUCTIONS TO BE ISSUED

(71) Applicant: Marvell International Ltd., Hamilton (BM)

(72) Inventors: Warren Menezes, San Jose, CA (US); Joshua Smith, San Francisco, CA (US)

(73) Assignee: Marvell International Ltd., Hamilton (BM)

( * ) Notice: Subject to any disclaimer, the term of this patent is extended or adjusted under 35 U.S.C. 154(b) by 305 days.

(21) Appl. No.: 15/154,275

(22) Filed: May 13, 2016

Related U.S. Application Data

(60) Provisional application No. 62/164,317, filed on May 20, 2015.

(51) Int. Cl.
| | | |
|---|---|---|
| *G06F 9/30* | (2018.01) | |
| *G06F 9/38* | (2018.01) | |
| *G06F 12/0875* | (2016.01) | |
| *G06F 9/48* | (2006.01) | |
| *G06F 7/76* | (2006.01) | |

(52) U.S. Cl.
CPC .......... *G06F 9/3851* (2013.01); *G06F 9/3836* (2013.01); *G06F 9/3855* (2013.01); *G06F 9/4881* (2013.01); *G06F 12/0875* (2013.01); *G06F 7/76* (2013.01); *G06F 2212/452* (2013.01)

(58) Field of Classification Search
CPC .... G06F 9/3855; G06F 9/3836; G06F 9/4881; G06F 7/00; G06F 7/76
See application file for complete search history.

(56) References Cited

U.S. PATENT DOCUMENTS

| | | | | |
|---|---|---|---|---|
| 6,247,114 B1* | 6/2001 | Trull | ..................... | G06F 9/3802 |
| | | | | 712/202 |
| 6,487,550 B1* | 11/2002 | Cutter | ....................... | G06F 7/74 |
| 7,080,170 B1* | 7/2006 | Zuraski, Jr. | ............... | G06F 5/10 |
| | | | | 710/52 |
| 9,740,494 B2* | 8/2017 | Clark | .................... | G06F 9/3836 |
| 9,740,495 B2* | 8/2017 | Guo | ..................... | G06F 9/3855 |
| 2004/0268335 A1* | 12/2004 | Martin | ................. | G06F 8/4452 |
| | | | | 717/161 |
| 2016/0259648 A1* | 9/2016 | Di | ......................... | G06F 9/3836 |

* cited by examiner

*Primary Examiner* — Aimee Li
*Assistant Examiner* — Courtney P Carmichael-Moody

(57) ABSTRACT

A circuit includes an instruction scheduling circuit and an instruction buffer including entries. The entries each include an instruction, a validity indication, and an attribute. The instruction scheduling circuit partitions the entries into first sets, determines second sets by reordering the entries of each first set according to their attributes, determines a set ordering for the first sets according to a function of their attributes, and selects, based on the set ordering, instructions from the second sets. A process for selecting instructions to issue receives entries, each entry including an instruction, a validity indications, and an attribute. The process partitions the entries into first sets, determines second sets by reordering the entries of each first set according to their attributes, determines a set ordering for first sets according to a function of the attributes of their entries, and selects, based on the set ordering, instructions from the second sets.

20 Claims, 6 Drawing Sheets

SELECTION OF INSTRUCTIONS TO BE ISSUED

CROSS REFERENCE TO RELATED APPLICATION

This present disclosure claims the benefit of U.S. Provisional Application No. 62/164,317, filed on May 20, 2015, which is incorporated by reference herein in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

An instruction scheduling circuit of a processor may perform Out-of-Order issue of computer programming instructions (hereinafter, instructions). That is, the instruction scheduling circuit may issue the instructions in an order different from an original order of the instructions in a program. Out-of-order issue may be used to minimize the effects of result latency (such as load latencies) in a pipelined processor, and may be used to exploit instruction-level parallelism in a superscalar processor.

The number of instructions that may be issued by a processor during a clock cycle may be limited by an issue width of the processor. For example, a processor may be limited to issuing only three instructions per clock cycle.

When the number of instructions that are available for issue is larger than the issue width of the processor, the instructions scheduler may select a subset of the instructions that are available for issue during the clock cycle as the instructions to be issued.

Because an instruction may not be able to execute until one or more other instructions have produced their respective results, the order in which the instruction scheduling circuit selects instructions may affect the performance of the processor. The performance of the processor may also be affected by the amount of time the instruction scheduling circuit needs to select instructions.

SUMMARY

Embodiments relate to scheduling instructions for issue, and in particular to selecting a plurality of instructions to be issued from an instruction buffer.

In an embodiment, a circuit comprises an instruction buffer including a plurality of entries. Each entry including an instruction, a validity indication, and at least one attribute. The circuit further comprises an instruction scheduling circuit to i) partition the plurality of entries into a plurality of first sets, ii) determine a plurality of second sets by reordering the respective entries of each first set according to the attributes of the respective entries, iii) determine a set ordering for the plurality of first sets according to a function of the attributes of the respective entries of each first set, and iv) select, based on the set ordering, a plurality of instructions from the plurality of second sets. The selected plurality of instructions are to be issued.

In an embodiment, a method for selecting instructions to issue comprises i) receiving, by an instruction scheduling circuit, a plurality of entries, each entry including an instruction, a validity indication, and at least one attribute, ii) partitioning, by the instruction scheduling circuit, the plurality of entries into a plurality of first sets, iii) determining, by the instruction scheduling circuit, a plurality of second sets by reordering the respective entries of each first set according to the attributes of the respective entries, iv) determining, by the instruction scheduling circuit, a set ordering for the plurality of first sets according to a function of the attributes of the respective entries of each first set, and v) selecting, by the instruction scheduling circuit and based on the set ordering, a plurality of instructions from the plurality of second sets. The selected plurality of instructions are to be issued.

DETAILED DESCRIPTION

Figure 1:
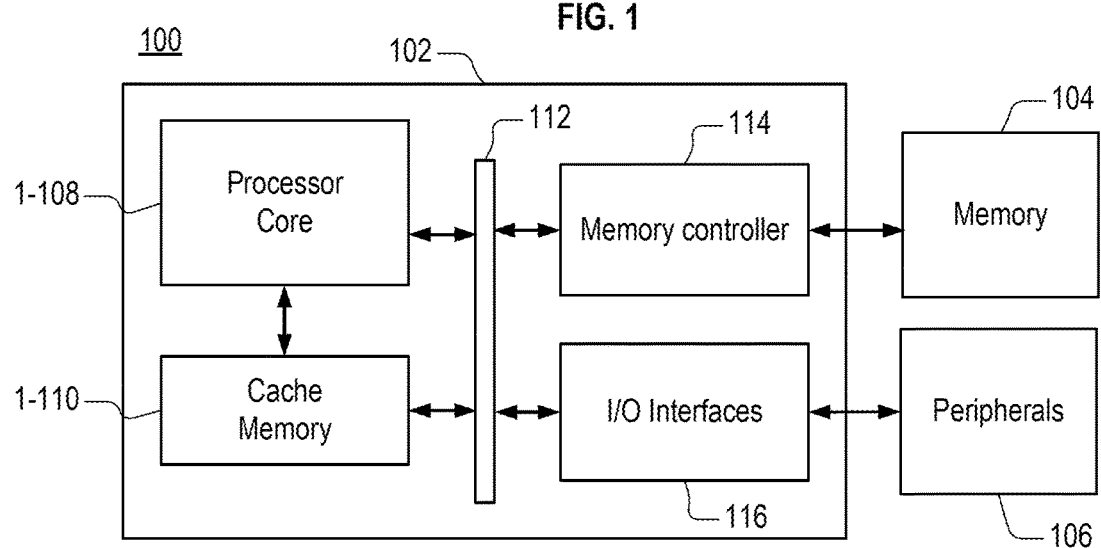
FIG. 1 illustrates an electronic system according to an embodiment of the present disclosure.

FIG. 1 illustrates an electronic system 100 according to an embodiment of the present disclosure. The electronic system 100 includes a computer processor 102, an electronic storage circuit (hereinafter, a memory) 104, and one or more peripherals 106. In an embodiment, the electronic system 100 is a System-on-a-Chip (SoC).

The computer processor 102 includes a processor core 1-108, a cache memory (hereinafter, a cache) 1-110, a bus 112, a memory controller 114, and one or more Input/Output (I/O) interfaces 116. In an embodiment, the computer processor 102 is a System-on-a-Chip (SoC).

A memory controller 114 of the computer processor 102 is coupled to the memory 104 and operates to store information in the memory 104 (that is, to write to the memory 104) and to retrieve information stored in the memory 104 (that is, to read from the memory 104). The information may include data, computer programming instructions, or both.

The memory 104 includes a non-transient computer readable medium, including one or more of a Read-Only Memory (ROM), a volatile Random Access Memory (RAM), and a non-volatile memory. The ROM may include on or more a Programmable ROM (PROM), an Erasable Programmable ROM (EPROM), and the like. The RAM may include one or more of a Static RAM (SRAM), a Dynamic RAM (DRAM), and the like. The non-volatile memory may include one or more of an Electrically Erasable Programmable ROM (EEPROM), a Flash memory, a phase-change memory, and the like.

The I/O interfaces 116 may include one or more of a serial digital interface, a parallel digital interface, an analog interface, a network interface, and the like. Each of the I/O interfaces 116 may be an input interface, and output interface, or a bidirectional interface. The I/O interfaces 116 provide communication, control, or both for the peripherals 106.

The I/O interfaces 116 may also include one or bus interfaces, such as a Peripheral Component Interconnect (PCI) bus interface, a PCI eXtended (PCI-X) bus interface, an Inter-Integrated Circuit (I2C) bus interface, and the like. The I/O interfaces 116 may include Direct Memory Access (DMA) devices.

The peripherals 106 may include one or more mass storage devices, such as an optical disc drive, a hard disc drive, a solid state disc, and the like. The peripherals 106 may include one or more network interfaces, such as an Ethernet® adapter, a Wireless Local Area Network (WLAN) adapter, a Personal Area Network (PAN) adapter, and the like. The peripherals 106 may include on or more of a display adapter, a camera, a sensor, a Human Interface Device (HID), an actuator, and the like.

The bus 112 provides communications between the processor core 1-108, the memory controller 114, and the I/O interfaces 116. In the embodiment shown in FIG. 1, the bus 112 also provides communications between the cache 1-110 and the memory controller 114. In another embodiment, the cache 1-110 may connect to the memory controller 114 through a dedicated point-to-point connection.

The cache 1-110 provides information corresponding to memory locations in the memory 104 to the processor core 1-108. The cache 1-110 provides the information with a lower latency, a higher bandwidth, or both than the memory 104 is capable of.

The cache 1-110 may include one or more of a first-level cache, a second-level cache, a third-level cache, and so on.

The processor 1-108 performs functions of the electronic system 100 by executing computer programming instructions retrieved from a non-transient computer-readable media, such as one or more of the cache 1-110 and the memory 104. The processor 1-108 may read, write, and manipulate data stored in the one or more of the cache 1-110, the memory 104, and the I/O interfaces 116.

Although the processor core 1-108 is described herein as a processor, embodiments are not limited thereto. In an embodiment, the processor core 1-108 may be a programmable Graphics Processing Unit (GPU) or other type of semiconductor circuit that executes instructions, manipulates data, or both, where the instructions, data, or both are stored in the memory 104, the cache memory 1-110, or both.

Figure 2:
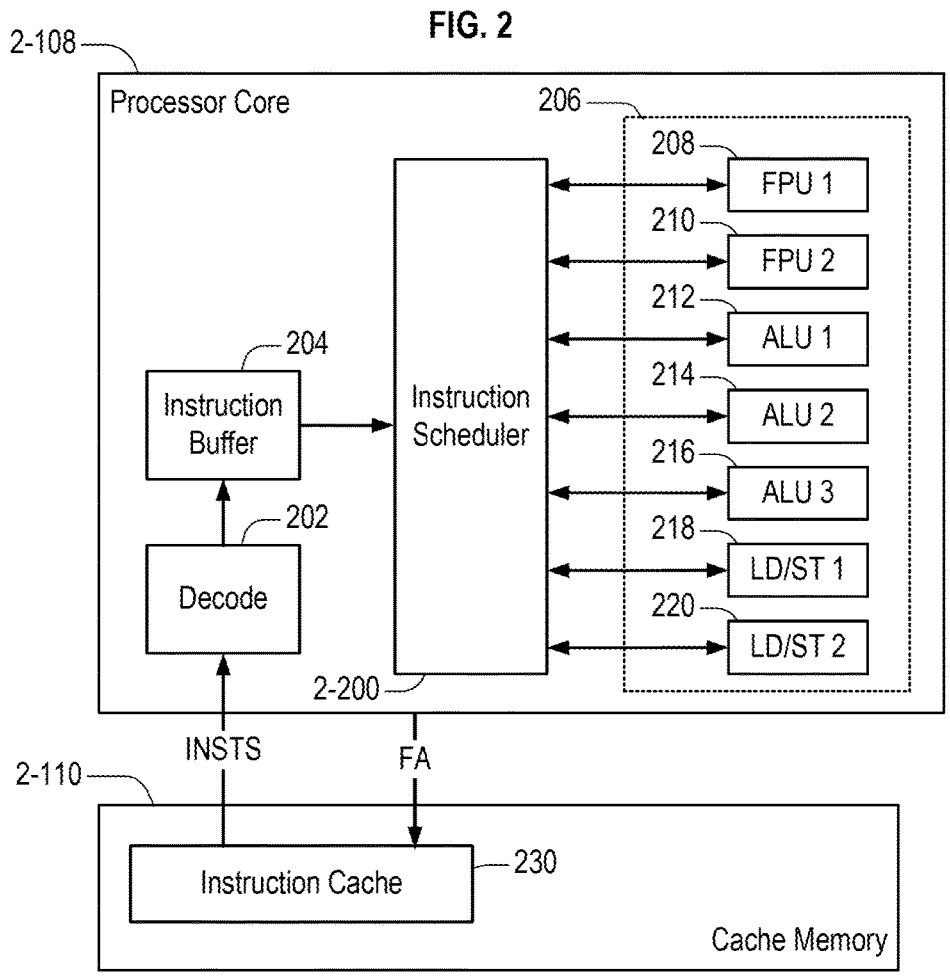
FIG. 2 illustrates a functional blocks of a processor and a cache according to an embodiment.

FIG. 2 illustrates portions of a processor core 2-108 and a cache 2-110 according to an embodiment. The processor core 2-108 and the cache 2-110 may respectively correspond to the processor core 1-108 and the cache 1-110 of FIG. 1.

The processor core 2-108 includes a decode circuit 202, an instruction buffer 204, an instruction scheduling circuit 2-200, and an execution unit 206. The execution unit 206 includes a plurality of functional units, including, for example, a first Floating Point Unit (FPU) 208, a second FPU 210, a first Arithmetic, and Logic Unit (ALU) 212, a second ALU 214, a third ALU 216, a first Load and Store Unit (LSU) 218, and a second LSU 220.

The processor core 2-108 may include one or more other circuits such as register renaming circuits, pipeline control circuits, cache control circuits, branch prediction circuits, address translation circuits, clock circuits, and the like, which are omitted for the sake of brevity.

The cache 2-110 includes an Instruction Cache (I-Cache) 230. The cache 2-110 may include other circuits such as a data cache, a second level cache, write buffers, memory coherency circuits, address translation circuits, prefetch circuits, memory coherency circuits, clock circuits, and the like, which are omitted for the sake of brevity.

The I-Cache 230 receives a fetch address FA from the processor core 2-108, and provides undecoded instructions INSTS corresponding to the fetch address FA to the processor core 2-108. The I-Cache 230 may retrieve the undecoded instructions INSTS from memory circuits in the I-Cache 230, from another cache, or from a memory such as the memory 104 of FIG. 1.

The decode circuit 202 produces decoded instructions, hereinafter referred to as instructions, by decoding the undecoded instructions. In an embodiment, the instructions may be micro-ops.

The decode circuit 202 may also determine attributes of the instructions. For example, the decoder circuit 202 may determine a weight of each instruction, the weight corresponding to a latency of a result produced by the instruction.

The decode circuit 202 provides the instructions and the respective attributes produced by the decoding circuit 202 to the instruction buffer 204.

The instruction buffer 204 includes a plurality of instructions, including instructions that are ready to be issued and instructions that are not ready to be issued. The instruction buffer 204 provides one or more of the instructions that are ready to be issued to the instruction scheduling circuit 2-200.

In an embodiment, an instruction may be ready to issue when a reservation station is available for the instruction. In an embodiment, an instruction may be ready to issue when data required by the instruction is available. In an embodiment, an instruction may be ready to issue when a hardware resource required by the instruction is available. In an embodiment, a combination of the above conditions may determine whether an instruction is ready to issue.

The instruction scheduling circuit 2-200 selects one or more instructions of the instructions provided by the instruction buffer. The number of instructions selected may be determined by an issue width of the processor. The issue width of the processor may from time to time be smaller than the number of instructions that are ready to be issued.

The instruction scheduling circuit 2-200 issues the selected instructions to the appropriate respective functional units of the execution unit 206. For example, a selected floating point instruction may be issued to one of the FPUs 208 and 210, a selected logical instruction may be issued to one of the ALUs 212, 214, and 216, and a selected load instruction may be issued to one of the LSUs 218 and 220.

Although FIG. 2 illustrates an instruction scheduling circuit 2-200 that schedules instructions for all of the functional units of the execution unit 206, other embodiments are not limited thereto. For example, in an embodiment, a first instruction scheduling circuit may schedule instructions for the FPUs 208 and 210, a second instruction scheduling circuit may schedule instructions for the ALUs 212, 214, and 216, and a third instruction scheduling circuit may schedule instructions for the LSUs 218 and 220.

Because an instruction may not be able to execute until one or more other instructions have produced their respective results, the order in which the instruction scheduling circuit 2-200 selects instructions to issue may affect the rate at which the processor can execute instructions. For example, the instruction scheduling circuit 2-200 may select a first instruction having a long latency to issue as early as possible and delay a second instruction that uses the result of the first operation, thereby reducing the effect of the latency of the instruction.

The execution unit 206 executes the instructions issued by the instruction scheduling circuit 2-200.

Figure 3:
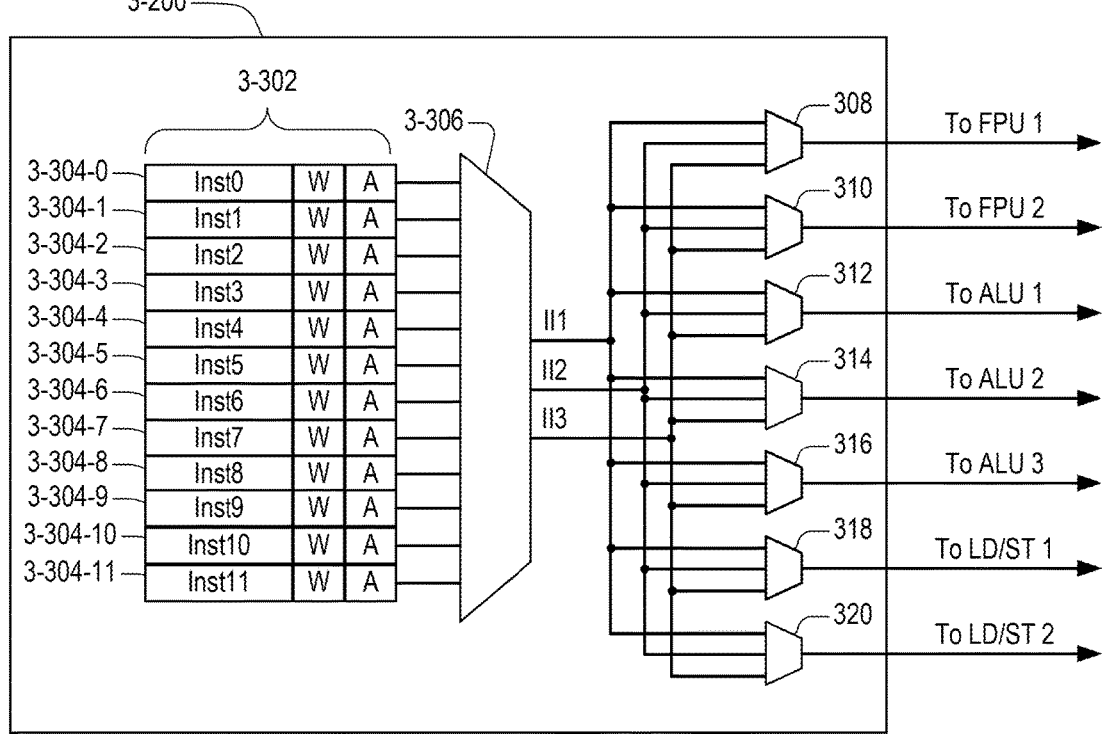
FIG. 3 illustrates an instruction sequencer according to an embodiment.

FIG. 3 illustrates an instruction scheduling circuit 3-200 according to an embodiment. The instruction scheduling circuit 3-200 may be included in the instruction scheduling circuit 2-200 of FIG. 2.

The instruction scheduling circuit 3-200 includes an instruction window 3-302 including first through twelfth entries 3-304-0 through 3-304-11, respectively. The entries 3-304-0 through 3-304-11 respectively include first to twelfth instructions Inst0 through Inst11. Each of the entries 3-304-0 through 3-304-11 may also respectively include an attribute associated with the respective instruction Inst0 through Inst11, such as a weight attribute W corresponding to a latency of a result of the respective instruction. Each of the entries 3-304-0 through 3-304-11 may also include an attribute associated with the entry, such as an age attribute A corresponding to a time the entry has been in the instruction window.

The instruction scheduling circuit 3-200 includes a selection circuit 3-306 that selects a number of instructions (e.g., up to three instructions) from the instruction window 3-302 and issues them. The issued instructions may include a first issued instruction II1, a second issued instruction II2, and a third issued instruction II3.

The issued instructions II1, II2, and II3 are each routed, using first to seventh multiplexers 308 to 320, to respective functional units such as the functional units of the execution unit 206 of FIG. 2. The determination of which functional unit each of the issued instructions II1, II2, and II3 are routed to may be determined by one or more of a type of the instruction and an availability of a functional unit, among other criteria.

It should be noted that the configuration shown in FIG. 3 is for illustrative purposes and not intended to be limitations. For example, the instruction scheduling circuit 3-200 may include more or less entries, more or less instructions (each of which may include more or less attributes). It should be further noted that the selection circuit 3-306 may be configured to select more or less instructions from the instruction window 3-302 to be issued. It should also be noted that the instruction scheduling circuit 3-200 may include more or less multiplexers to multiplex the selected instructions to respective functional units.

Figure 4:
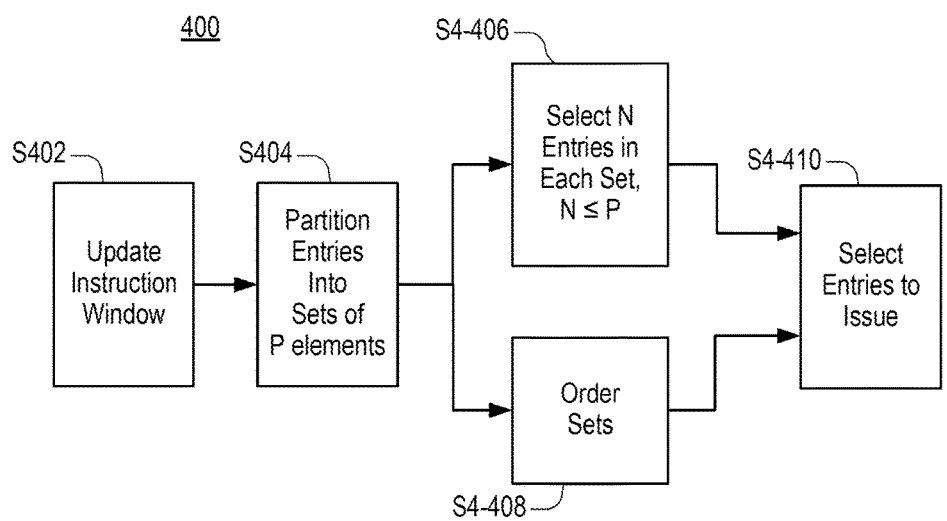
FIG. 4 illustrates a process for determining instructions to be issued according to an embodiment.

FIG. 4 illustrates a process 400 for selecting instructions to be issued according to an embodiment. The process 400 may be performed by an instruction scheduling circuit such as the instruction scheduling circuit 3-200 of FIG. 2.

At S402, the instruction scheduling circuit updates an instruction window including a plurality of entries. Each entry includes an instruction, a validity indicator, and one or more attributes. The attributes may include one or more of a weight attribute W corresponding to a latency of a result, an age attribute A corresponding to a time an entry has been in the instruction window, and the like.

Updating the instruction window includes removing instructions issued during a previous execution of the process 400 from the instruction window and replacing the removed instructions with other instructions that were not in the instruction window.

At S404, the instruction scheduling circuit partitions the entries in the instruction window into a plurality sets having no more than P elements, where P is a predetermined value. The partitioning of the entries into the sets may be performed by a selection circuit such as the selection circuit 3-306 of FIG. 3.

In an embodiment, a value of P may be determined according to a number of entries in the instruction window and an issue width of the processor, such that the number of sets is equal to the issue width. For example, in a processor having an issue width of three instructions and an instruction window having 12 entries, P may be equal to [12/3]=4 entries per set.

In an embodiment, sets of the plurality of sets may have a different number of entries.

In an embodiment, the partitioning of the entries in the instruction window into the sets is fixed. For example, for the instruction window 3-302 of FIG. 3, the first to fourth entries 3-304-0 to 3-304-3 respectively may be included in a first set, the fifth to eighth entries 3-304-4 to 3-304-7 respectively included in a second set, and the ninth to twelfth entries 3-304-8 through 3-304-11 respectively included in a third set.

At S4-406, the process 400 selects and orders N entries in each set, where N is less than or equal to P. The selection and ordering of the N entries in each set may be performed by a selection circuit such as the selection circuit 3-306 of FIG. 3.

In an embodiment, N is less than or equal to the issue width of the processor.

In an embodiment, the N entries are selected and ordered according to one or more attributes of the entries. In an embodiment, the process 400 may select an entry having a highest weight attribute among the entries in the set as a first selected entry, an entry having a second highest weight attribute among the entries in the set as a second selected entry, and so on.

At S4-408, the process 400 determines an ordering of the sets. The ordering of the sets may be performed by the selection circuit such as the selection circuit 3-306 of FIG. 3.

The ordering of the sets may be determined according to a result of applying an attribute function. The attribute function may use one or more of the attributes of the entries of each set to determine a value for each set.

For example, the attribute function may produce a value for a set corresponding to (i) a sum of age attribute values of valid entries of the set, (ii) a sum of weight attributes of the valid entries of the set, (iii) the sum of (i) and (ii), or the like.

In an embodiment, the process 400 performs some or all of the operations performed in S4-406 in parallel with (that is, simultaneously with the performance of) some or all of the operations performed in S4-408.

At S4-410, the process 400 select one or more instructions to issue according to the ordering of the entries in each set and the ordering of the sets. The selection and ordering of the N entries in each set may be performed by a selection circuit such as the selection circuit 3-306 of FIG. 3.

In the description that follows, a first-ordered set corresponds to a set having a first position in the ordering of the sets, a second-ordered set corresponds to a set having a second position in the ordering of the sets, and a third-ordered set corresponds to a set having a third position in the ordering of the sets.

In an embodiment, the process 400 selects the first selected entry of the first-ordered set as a first instruction to issue.

In an embodiment, the process 400 selects the second selected entry of the first-ordered set as a second instruction to issue when the first-ordered set includes a valid second selected entry. The process 400 selects the first selected entry of the second-ordered set as the second instruction to issue when the first-ordered set does not include the valid second selected entry.

In an embodiment, the process 400 selects the third selected entry of the first-ordered set as a third instruction to issue when the first-ordered set includes a valid third selected entry. The process 400 selects the first selected entry of the second-ordered set as the third instruction to issue when the first-ordered set includes the valid second selected entry and does not include the valid third selected entry. The process 400 selects the second selected entry of the second-ordered set as the third instruction to issue when the second-ordered set includes the valid second selected entry and the first-ordered set does not include the valid second selected entry. The process 400 selects the first selected entry of the third-ordered set as the third instruction to issue when the first-ordered set does not include the valid second selected entry and the second-ordered set does not include does not include the valid second selected entry.

Figure 5:
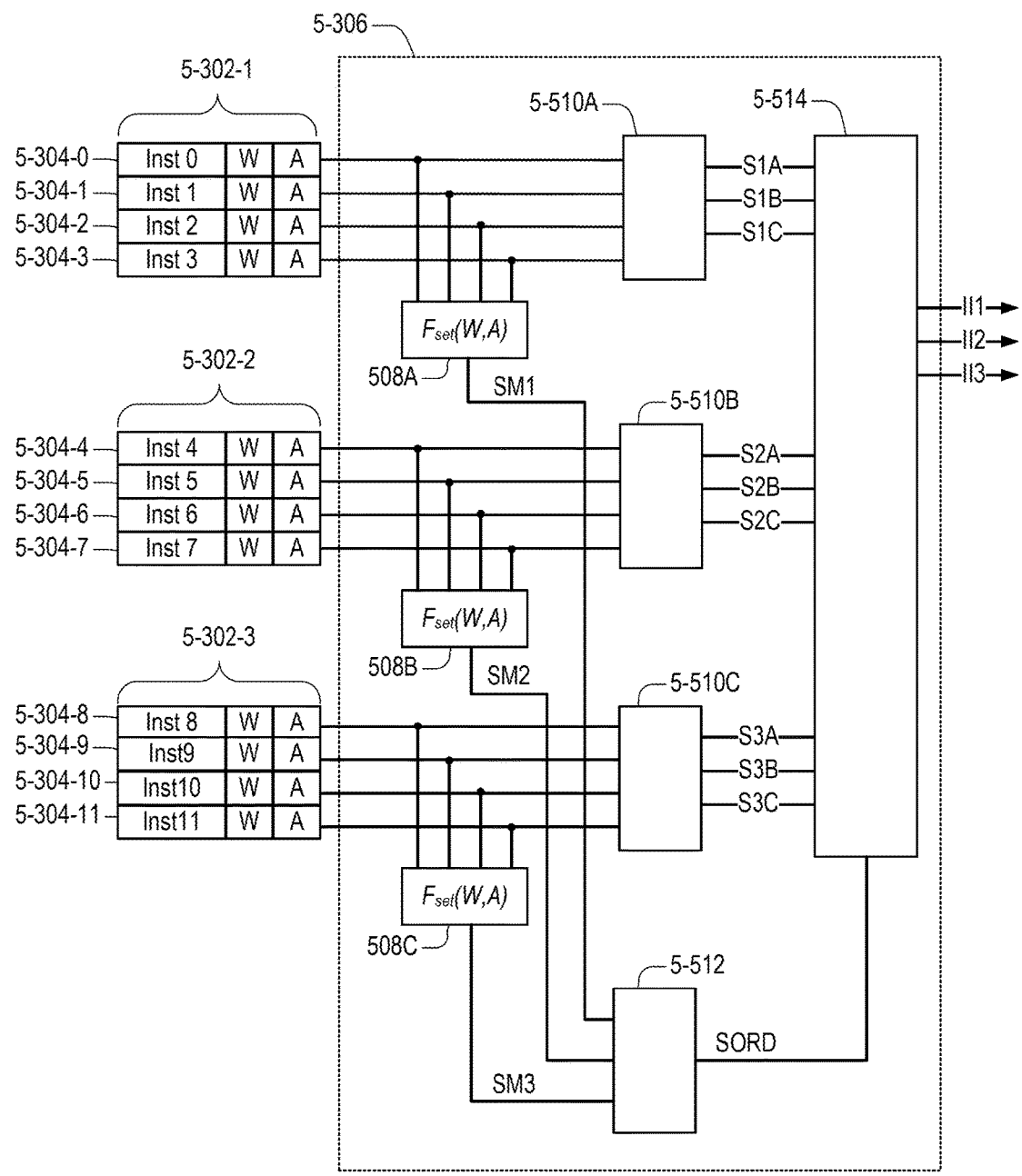
FIG. 5 illustrates an instruction selection circuit according to an embodiment.

FIG. 5 illustrates a selection circuit 5-306 according to an embodiment. The selection circuit 5-306 may be included in the selection circuit 3-306 of FIG. 3.

The selection circuit 5-306 includes first, second, and third attribute function circuits 508A, 508B, and 508C respectively and first, second, and third entry ordering circuits 5-510A, 5-510B, and 5-510C respectively. The selection circuit 5-306 also includes a set ordering circuit 5-512 and a partial order combining circuit 5-514.

The selection circuit 5-306 receives a first set 5-302-1 including first to fourth entries 5-304-0 to 5-304-3, a second set 5-302-2 including fifth to eighth entries 5-304-4 to 5-304-7, and a third set 5-302-3 including ninth to twelfth entries 5-304-8 to 5-304-11. The sets 5-302-1 to 5-302-3 may be results of partitioning an instruction window such as the instruction window 3-302 of FIG. 3.

The first attribute circuit 508A generates, using an attribute function $F_{set}$, a first set metric SM1 according to whether the first set 5-302-1 includes a valid entry and attributes of the entries of the first set 5-302-1. The second attribute circuit 508B generates, using the attribute function $F_{set}$, a second set metric SM2 according to whether the second set 5-302-2 has a valid entry and attributes of the entries of the second set 5-302-2. The third attribute circuit 508C generates, using an attribute function $F_{set}$, a third set metric SM3 according to whether the third set 5-302-3 has a valid entry and attributes of the entries of the third set 5-302-3.

In an embodiment, each of the attribute circuits 508A, 508B, and 508C generate the respective set metric SM1, SM2, and SM2 using the attribute function $F_{set}$ when the respective set 5-302-1, 5-302-2, 5-302-3 includes at least one valid entry, and generate the respective set metric SM1, SM2, and SM2 having a predetermined value (such as zero or a negative number having a large magnitude) when the respective set 5-302-1, 5-302-2, 5-302-3 does not include a valid entry.

The attribute function Fset may produce a result according to one or more of (i) a sum of respective first attributes of the entries of an input set, (ii) a maximum value of the respective first attributes, (iii) a bit-wise logical-or of the respective first attributes, (iv) a combination of (i), (ii), or (iii) with a sum or maximum value of respective second attributes of the entries, and the like.

The set ordering circuit 5-512 receives the set metrics SM1, SM2, and SM3 and produces a set ordering SORD according to the set metrics SM1, SM2, and SM3. The set ordering SORD indicates a first-ordered set having a set metric greater than or equal to the corresponding set metrics of the other sets, a second-ordered set having a set metric greater than or equal to a set metrics of at least one of the other sets, and a third-ordered set having a set metric less than or equal to the corresponding set metrics the other two sets.

For example, if the set metrics SM1, SM2, and SM3 have respective values of 10, 16, and 6, the set ordering SORD would indicate the second set 5-302-2, the first set 5-302-1, and the third set 5-302-3 as the first, second and third ordered sets, respectively.

The first entry ordering circuit 5-510A performs an ordering of the entries 5-304-0 to 5-304-3 of the first set 5-302-1 and outputs a first-ordered instruction of the first set S1A, a second-ordered instruction of the first set SIB, and a third-ordered instruction of the first set SIC according to that ordering. The first-ordered instruction of the first set S1A, the second-ordered instruction of the first set SIB, and the third-ordered instruction of the first set SIC respectively correspond to the first-ordered entry, second-ordered entry, and third-ordered entry of the entries 5-304-0 to 5-304-3 of the first set 5-302-1.

The second entry ordering circuit 5-510B performs an ordering of the entries 5-304-4 to 5-304-7 of the second set 5-302-2 and outputs a first-ordered instruction of the second set S2A, a second-ordered instruction of the second set S2B, and a third-ordered instruction of the second set S2C according to that ordering. The first-ordered instruction of the second set S2A, the second-ordered instruction of the second set S2B, and the third-ordered instruction of the second set S2C respectively correspond to the first-ordered entry, second-ordered entry, and third-ordered entry of the entries 5-304-4 to 5-304-4 of the second set 5-302-2.

The third entry ordering circuit 5-510C performs an ordering of the entries 5-304-8 to 5-304-11 of the third set 5-302-3 and outputs a first-ordered instruction of the third set S3A, a second-ordered instruction of the third set S3B, and a third-ordered instruction of the third set S3C according to that ordering. The first-ordered instruction of the third set S3A, the second-ordered instruction of the third set S3B, and the third-ordered instruction of the third set S3C respectively correspond to the first-ordered entry, second-ordered entry, and third-ordered entry of the entries 5-304-8 to 5-304-11 of the third set 5-302-3.

The partial order combining circuit 5-514 selects first, second, and third issued instructions II1, II2, and II3 respectively from the outputs of the entry ordering circuits 5-510A, 5-510B, and 5-510C according to the sort order SORD produced by the set ordering circuit 5-512. The attribute function $F_{set}$ is selected to characterize each of the sets 5-302-1 to 5-302-3 so that the partial order combining circuit 5-514 selects issued instructions II1, II2, and II3 with an accuracy that approaches that of a complete ordering of the entries in the instruction window.

It should be noted that the configuration shown in FIG. 5 is for illustrative purposes and not intended to be limitations. For example, the sets 5-302-1 to 5-302-3 may include more or less entries, more or less instructions (each of which may include more or less attributes). It should be further noted that the entry ordering circuits 5-510A to 5-510C may be configured to output more or less instructions, and that the partial order combining circuit 5-514 may be configured to select more or less instructions to be issued. It should also be noted that the selection circuit 5-306 may include more or less of attribute circuits and entry ordering circuits, and that the set ordering circuit 5-512 may therefore have more or fewer inputs.

Figure 6:
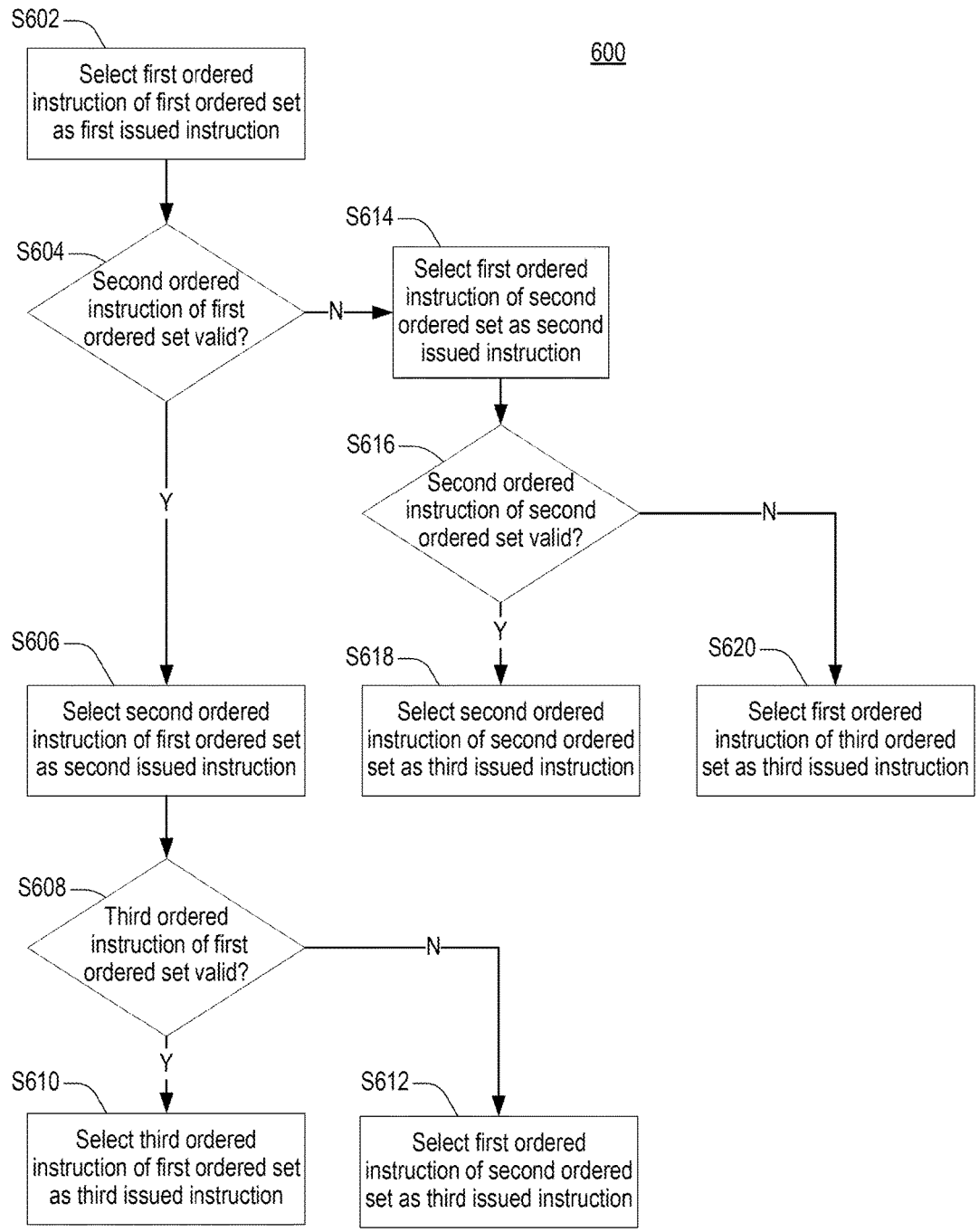
FIG. 6 is a flowchart of a process for selecting issued instructions according to an embodiment.

FIG. 6 is a flowchart of a process 600 for selecting issued instructions according to an embodiment. The process 600 may be performed by a partial order combining circuit such as the partial order combining circuit 5-514 of FIG. 5.

At S602, the process 600 selects a first-ordered instruction of a first-ordered set as a first issued instruction.

At S604, the process 600 determines whether a second-ordered instruction of the first-ordered set is valid. At S604, the process 600 proceeds to S606 when the second-ordered instruction of the first-ordered set is valid. Otherwise, at S604 the process 600 proceeds to S614.

At S606, the process 600 selects the second-ordered instruction of the first-ordered set as a second issued instruction.

At S608, the process 600 determines whether a third-ordered instruction of the first-ordered set is valid. At S608, the process 600 proceeds to S610 when the third-ordered instruction of the first-ordered set is valid. Otherwise, at S608 the process 600 proceeds to S612.

At S610, the process 600 selects the third-ordered instruction of the first-ordered set as a third issued instruction.

At S614, the process 600 selects a first-ordered instruction of a second-ordered set as the second issued instruction.

At S616, the process 600 determines whether a second-ordered instruction of the second-ordered set is valid. At S616, the process 600 proceeds to S618 when the second-ordered instruction of the second-ordered set is valid. Otherwise, at S612 the process 600 proceeds to S620.

At S618, the process 600 selects the second-ordered instruction of the second-ordered set as a third issued instruction.

At S620, the process 600 selects a first-ordered instruction of a third-ordered set as a third issued instruction.

Figure 7:
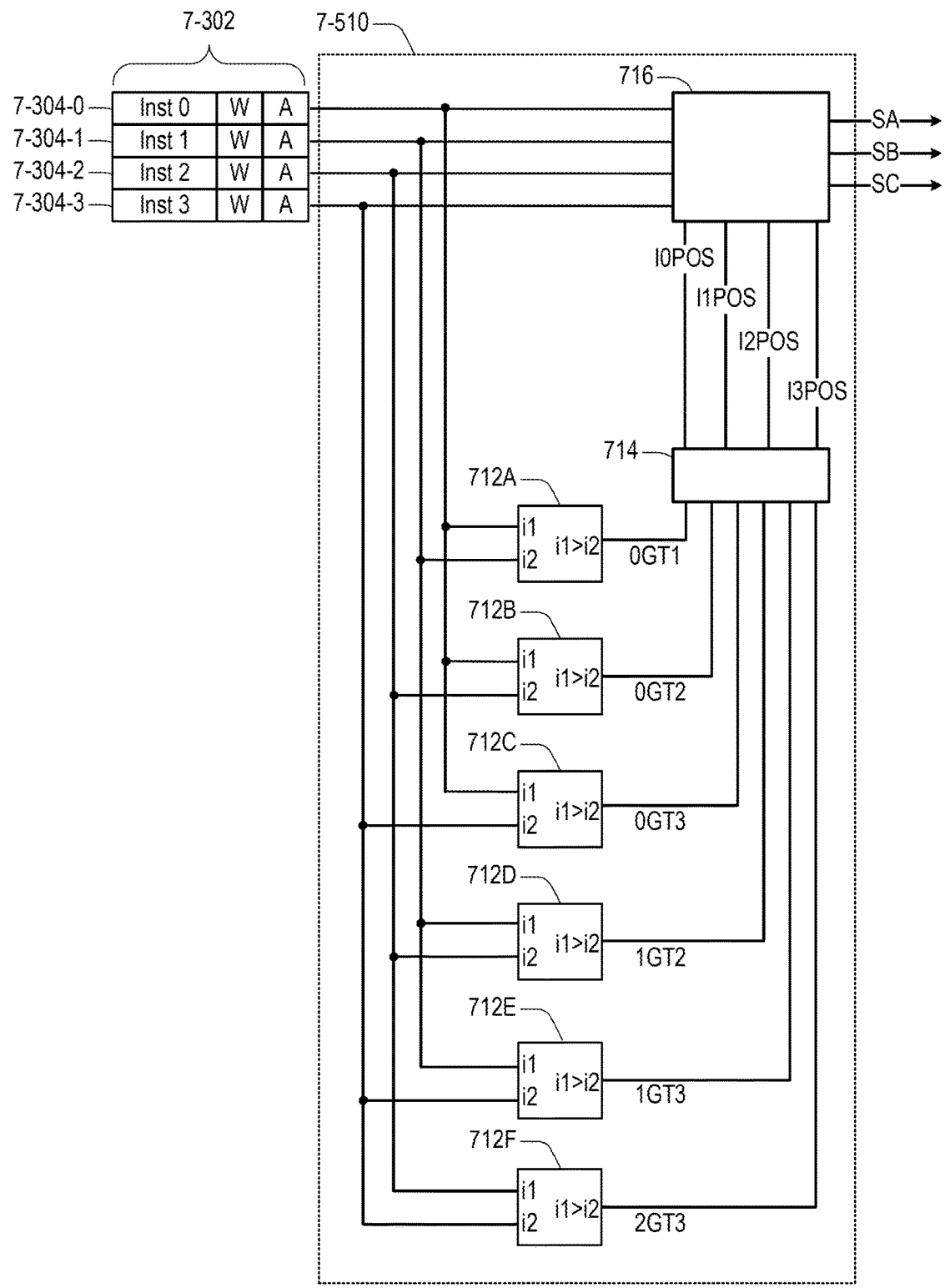
FIG. 7 illustrates an entry ordering circuit according to an embodiment.

FIG. 7 is a diagram of an entry ordering circuit 7-510 according to an embodiment. The entry ordering circuits 5-510A, 5-510B, and 5-510C of FIG. 5 may each include a circuit such as the entry ordering circuit 7-510.

The entry ordering circuit 7-510 includes first to sixth comparators 712A to 712F respectively, a position determining circuit 714, and an output select circuit 716.

The entry ordering circuit 7-510 receives a set 7-302 including first to fourth entries 7-304-0 to 7-304-3 respectively, each entry including a respective instruction and corresponding first and second attributes W and A respectively. The set 7-302 may correspond to the first set 5-302-1, the second set 5-302-2, or the third set 5-302-3 of FIG. 5.

The first comparator 712A compares the first attribute W of the first entry 7-304-0 to the first attribute W of the second entry 7-304-1 and produces a first comparison output 0GT1 indicating whether the first attribute W of the first entry 7-304-0 is greater than the first attribute W of the second entry 7-304-1.

The second comparator 712B compares the first attribute W of the first entry 7-304-0 to the first attribute W of the third entry 7-304-2 and produces a second comparison output 0GT2 indicating whether the first attribute W of the first entry 7-304-0 is greater than the first attribute W of the third entry 7-304-2.

The third comparator 712C compares the first attribute W of the first entry 7-304-0 to the first attribute W of the fourth entry 7-304-3 and produces a third comparison output 0GT3 indicating whether the first attribute W of the first entry 7-304-0 is greater than the first attribute W of the fourth entry 7-304-3.

The fourth comparator 712D compares the first attribute W of the second entry 7-304-1 to the first attribute W of the third entry 7-304-2 and produces a fourth comparison output 1GT2 indicating whether the first attribute W of the second entry 7-304-1 is greater than the first attribute W of the third entry 7-304-2.

The fifth comparator 712A compares the first attribute W of the second entry 7-304-1 to the first attribute W of the fourth entry 7-304-3 and produces a fifth comparison output 1GT3 indicating whether the first attribute W of the f second entry 7-304-1 is greater than the first attribute W of the fourth entry 7-304-3.

The first comparator 712A compares the first attribute W of the third entry 7-304-2 to the first attribute W of the fourth entry 7-304-3 and produces a first comparison output 2GT3 indicating whether the first attribute W of the third entry 7-304-2 is greater than the first attribute W of the fourth entry 7-304-3.

The position determining circuit 714 receives the comparison outputs 0GT1, 0GT2, 0GT3, 1GT2, 1GT3, and 2GT3 and produces first, second, third, and fourth position indications I0POS, I1POS, I2POS, and I3POS respectively. The first to fourth position indications I0POS to I3POS respectively indicate the positions of the first to fourth entries 7-304-0 to 7-304-3.

In an embodiment, the position indications I0POS, I1POS, I2POS, and I3POS are one-hot encoded; that is, for example, a first bit I0POS[0] of the first position indication I0POS is set to one when the first entry 7-304-0 is the first entry in the order and set to zero otherwise, a second bit I0POS[1] of the first position indication I0POS is set to one when the first entry 7-304-0 is the second entry in the order and set to zero otherwise, and a third bit I0POS[2] of the first position indication I0POS is set to one when the first entry 7-304-0 is the third entry in the order and set to zero otherwise, and so on.

Table 1 illustrates values produced by the position determining circuit 714 for the first, second, and third bits I0POS[0], I0POS[1], and I0POS[2] respectively of the first position indication I0POS according to respective values of the first, second, and third comparison outputs 0GT1, 0GT2, and 0GT3, according to an embodiment:

TABLE 1

| 0GT1 | 0GT2 | 0GT3 | I0POS[0] | I1POS[1] | I2POS[2] |
|---|---|---|---|---|---|
| 0 | 0 | 0 | 0 | 0 | 0 |
| 0 | 0 | 1 | 0 | 0 | 1 |
| 0 | 1 | 0 | 0 | 0 | 1 |
| 0 | 1 | 1 | 0 | 1 | 0 |
| 1 | 0 | 0 | 0 | 0 | 1 |
| 1 | 0 | 1 | 0 | 1 | 0 |
| 1 | 1 | 0 | 0 | 1 | 0 |
| 1 | 1 | 1 | 1 | 0 | 0 |

Table 2 illustrates values produced by the position determining circuit 714 for the first, second, and third bits I1POS[0], I1POS[1], and I1POS[2] respectively of second position indication I1POS according to respective values of the first, fourth, and fifth comparison outputs 0GT1, 1GT2, and 1GT3, according to the embodiment:

TABLE 2

| 0GT1 | 1GT2 | 1GT3 | I1POS[0] | I1POS[1] | I2POS[2] |
|---|---|---|---|---|---|
| 0 | 0 | 0 | 0 | 0 | 1 |
| 0 | 0 | 1 | 0 | 1 | 0 |
| 0 | 1 | 0 | 0 | 1 | 0 |
| 0 | 1 | 1 | 1 | 0 | 0 |
| 1 | 0 | 0 | 0 | 0 | 0 |

TABLE 2-continued

| 0GT1 | 1GT2 | 1GT3 | I1POS[0] | I1POS[1] | I2POS[2] |
|---|---|---|---|---|---|
| 1 | 0 | 1 | 0 | 0 | 1 |
| 1 | 1 | 0 | 0 | 0 | 1 |
| 1 | 1 | 1 | 0 | 1 | 0 |

Table 3 illustrates values produced by the position determining circuit 714 for the first, second, and third bits I2POS[0], I2POS[1], and I2POS[2] respectively of third position indication I2POS according to respective values of the second, fourth, and sixth comparison outputs 0GT2, 1GT2, and 2GT3, according to the embodiment:

TABLE 3

| 0GT2 | 1GT2 | 2GT3 | I2POS[0] | I2POS[1] | I2POS[2] |
|---|---|---|---|---|---|
| 0 | 0 | 0 | 0 | 1 | 0 |
| 0 | 0 | 1 | 1 | 0 | 0 |
| 0 | 1 | 0 | 0 | 0 | 1 |
| 0 | 1 | 1 | 0 | 1 | 0 |
| 1 | 0 | 0 | 0 | 0 | 1 |
| 1 | 0 | 1 | 0 | 1 | 0 |
| 1 | 1 | 0 | 0 | 0 | 0 |
| 1 | 1 | 1 | 0 | 0 | 1 |

Table 3 illustrates values produced by the position determining circuit 714 for the first, second, and third bits I3POS[0], I3POS[ ], and I3POS[2] respectively of fourth position indication I3POS according to respective values of the third, fifth, and sixth comparison outputs 0GT3, 1GT3, and 2GT3, according to the embodiment:

TABLE 4

| 0GT3 | 1GT3 | 2GT3 | I3POS[0] | I3POS[1] | I3POS[2] |
|---|---|---|---|---|---|
| 0 | 0 | 0 | 1 | 0 | 0 |
| 0 | 0 | 1 | 0 | 1 | 0 |
| 0 | 1 | 0 | 0 | 1 | 0 |
| 0 | 1 | 1 | 0 | 0 | 1 |
| 1 | 0 | 0 | 0 | 1 | 0 |
| 1 | 0 | 1 | 0 | 0 | 1 |
| 1 | 1 | 0 | 0 | 0 | 1 |
| 1 | 1 | 1 | 0 | 0 | 0 |

The output select circuit 716 selects entries to output as the first-ordered instruction of the set SA, second-ordered instruction of the set SB, and third-ordered instruction of the set SC according to values of the position indications I0POS, I1POS, I2POS, and I3POS.

The output select circuit 716 selects the first entry 7-304-0 as the first-ordered instruction SA when bit I0POS[0] is 1, selects the second entry 7-304-1 as the first-ordered instruction SA when bit I1POS[0] is 1, selects the third entry 7-304-2 as the first-ordered instruction SA when bit I2POS[0] is 1, and selects the fourth entry 7-304-3 as the first-ordered instruction SA when bit I3POS[0] is 1.

The output select circuit 716 selects the first entry 7-304-0 as the second-ordered instruction SB when bit I0POS[1] is 1, selects the second entry 7-304-1 as the second-ordered instruction SB when bit I1POS[1] is 1, selects the third entry 7-304-2 as the second-ordered instruction SB when bit I2POS[1] is 1, and selects the fourth entry 7-304-3 as the second-ordered instruction SB when bit I3POS[1] is 1.

The output select circuit 716 selects the first entry 7-304-0 as the third-ordered instruction SC when bit I0POS[2] is 1, selects the second entry 7-304-1 as the third-ordered instruction SC when bit I1POS[2] is 1, selects the third entry 7-304-2 as the third-ordered instruction SC when bit I2POS[2] is 1, and selects the fourth entry 7-304-3 as the third-ordered instruction SC when bit I3POS[2] is 1.

Figure 8:
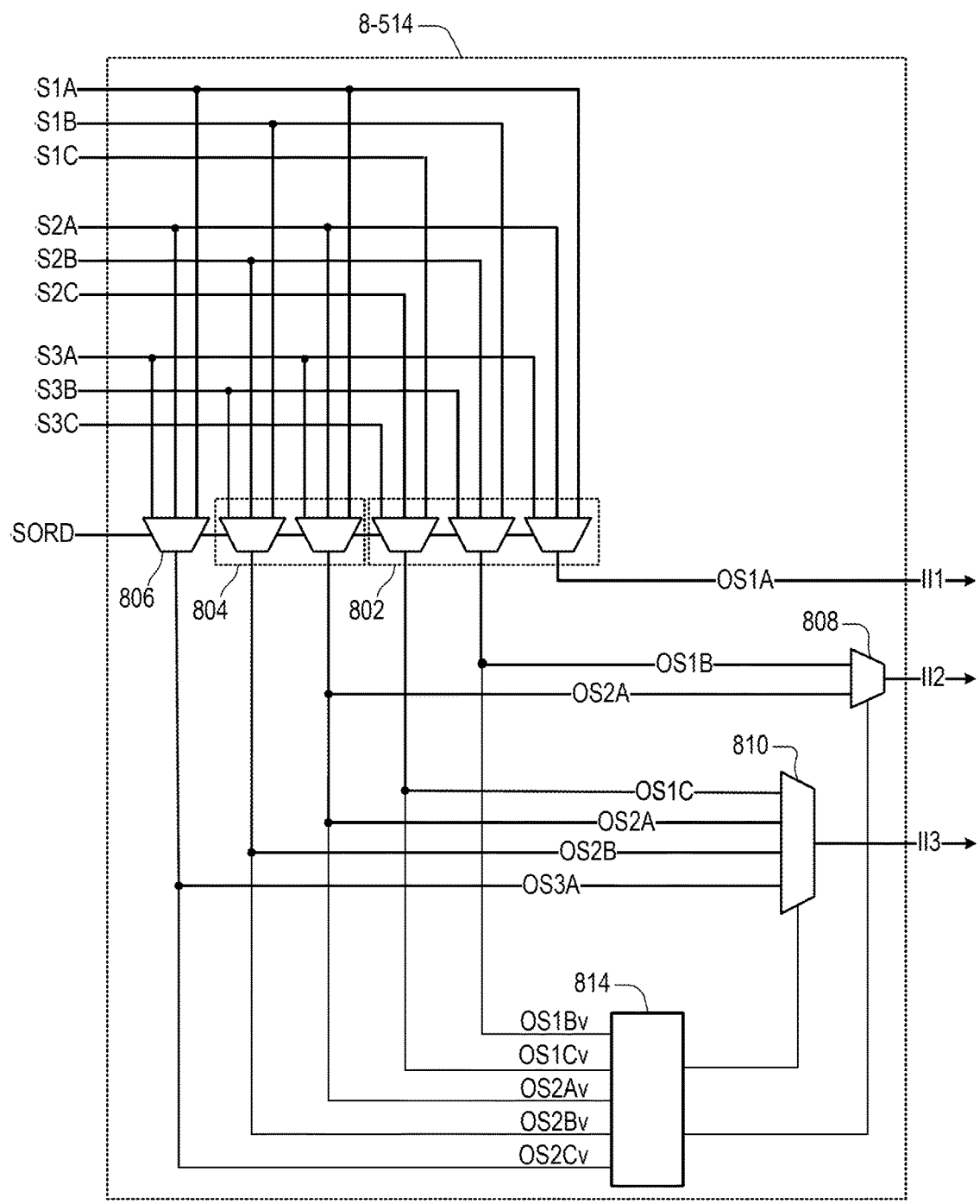
FIG. 8 illustrates a partial order combining circuit according to an embodiment.

FIG. 8 illustrates a partial order combining circuit 8-514 according to an embodiment. The partial order combining circuit 8-514 may be included in the partial order combining circuit 5-514 of FIG. 5.

The partial order combining circuit 8-514 includes first, second, and third set reordering circuits 802, 804, and 806 respectively, first multiplexer 808, second multiplexer 810, and output control circuit 812.

The partial order combining circuit 8-514 receives a first-ordered instruction of the first set S1A, a second-ordered instruction of the first set SIB, and a third-ordered instruction of the first set SIC respectively corresponding to a first-ordered entry, a second-ordered entry, and a third-ordered entry of a first set.

The partial order combining circuit 8-514 receives a first-ordered instruction of the second set S2A, a second-ordered instruction of the second set S2B, and a third-ordered instruction of the second set S2C respectively corresponding to a first-ordered entry, a second-ordered entry, and a third-ordered entry of a second set.

The partial order combining circuit 8-514 receives a first-ordered instruction of the third set S3A, a second-ordered instruction of the third set S3B, and a third-ordered instruction of the third set S3C respectively corresponding to a first-ordered entry, a second-ordered entry, and a third-ordered entry of a third set.

The partial order combining circuit 8-514 receives a set order signal SORD indicating an ordering of the first, second, and third set. In an embodiment, the set order signal SORD includes first, second, and third position indicators indicating respective positions of the first, second, and third set. The set order signal SORD indicates no more than one position for reach of the first, second, and third sets.

The set reordering circuits 802, 804, and 806 operate to reorder the received instructions according to the set order signal SORD.

The first set reordering circuit 802 selects instructions to respectively output as a first instruction of a first ordered set OS1A, a second instruction of the first ordered set OS1B, and a third instruction of the first ordered set OS1C.

When the set order signal SORD indicates that the first set has a first position, the first set reordering circuit 802 selects the first-ordered instruction of the first set S1A as the first instruction of the first ordered set OS1A, selects the second-ordered instruction of the first set SIB as the second instruction of the first ordered set OS1B, and selects the third-ordered instruction of the first set SIC as the third instruction of the first ordered set OS1C.

When the set order signal SORD indicates that the second set has the first position, the first set reordering circuit 802 selects the first-ordered instruction of the second set S2A as the first instruction of the first ordered set OS1A, selects the second-ordered instruction of the second set S2B as the second instruction of the first ordered set OS1B, and selects the third-ordered instruction of the second set S2C as the third instruction of the first ordered set OS1C.

When the set order signal SORD indicates that the third set has the first position, the first set reordering circuit 802 selects the first-ordered instruction of the third set S3A as the first instruction of the first ordered set OS1A, selects the second-ordered instruction of the third set S3B as the second instruction of the first ordered set OS1B, and selects the third-ordered instruction of the third set S3C as the third instruction of the first ordered set OS1C.

The second set reordering circuit 804 selects instructions to respectively output as a first instruction of a second ordered set OS2A and a second instruction of the second ordered set OS2B. Because the embodiment shown in FIG. 8 cannot select a third instruction of the second ordered set as one of the first, second, and third issued instructions I1, I2, and I3 respectively, the second set reordering circuit 804 may not output the third instruction of the second ordered set.

When the set order signal SORD indicates that the first set has a second position, the second set reordering circuit 804 selects the first-ordered instruction of the first set S1A as the first instruction of the second ordered set OS2A, and selects the second-ordered instruction of the first set SI B as the second instruction of the second ordered set OS2B.

When the set order signal SORD indicates that the second set has the second position, second set reordering circuit 804 selects the first-ordered instruction of the second set S2A as the first instruction of the second ordered set OS2A, and selects the second-ordered instruction of the second set S2B as the second instruction of the second ordered set OS2B.

When the set order signal SORD indicates that the third set has the second position, the second set reordering circuit 804 selects the first-ordered instruction of the third set S3A as the first instruction of the second ordered set OS2A, and selects the second-ordered instruction of the third set S3B as the second instruction of the second ordered set OS2B.

The third set reordering circuit 806 selects an instruction to output as a first instruction of the third ordered set OS3A. Because the embodiment shown in FIG. 8 cannot select either of second or third instructions of the third ordered set as one of the first, second, and third issued instructions I1, I2, and I3 respectively, the third set reordering circuit 806 may not output the second and third instruction of the third ordered set.

When the set order signal SORD indicates that the first set has a third position, the third set reordering circuit 806 selects the first-ordered instruction of the first set S1A as the first instruction of the third ordered set OS3A.

When the set order signal SORD indicates that the second set has the third position, the third set reordering circuit 806 selects the first-ordered instruction of the second set S2A as the first instruction of the third ordered set OS3A.

When the set order signal SORD indicates that the third set has the third position, the third set reordering circuit 806 selects the first-ordered instruction of the third set S3A as the first instruction of the third ordered set OS3A.

The partial order combining circuit 8-514 outputs the first instruction of the first ordered set OS1A as the first issued instruction I1. The partial order combining circuit 8-514 selects instructions to output as the second and third issued instructions I2 and I3 respectively using the first multiplexer 808 and second multiplexer 810 according to control signal produced by the output control circuit 812.

The output control circuit 812 circuit receives validity indicators corresponding to the instructions of the first, second, and third ordered sets.

Specifically, the output control circuit 812 receives first and second validity indicators OS1Bv and OS1Cv indicating validities of the second and third instructions of the first ordered set OS1B and OS1C respectively. The output control circuit 812 receives third and fourth validity indicators OS2Av and OS2Bv indicating validities of the first and second instructions of the second ordered set OS2A and OS2B respectively. The output control circuit 812 receives a fifth validity indicator OS3Av indicating a validity of the first instruction of the third ordered set OS3A. Each validity indicator has a true value when the corresponding instruction is valid and a false value otherwise.

The output control circuit 812 controls the first multiplexer 808 to output the second instruction of the first ordered set OS1B as the second issued instruction I2 when the first validity indicator OS1Bv is true.

The output control circuit 812 controls the first multiplexer 808 to output the first instruction of the second ordered set OS2A as the second issued instruction I2 when the first validity indicator OS1Bv is false and the third validity indicator OS2Av is true.

The output control circuit 812 controls the second multiplexer 810 to output the third instruction of the first ordered set OS1C as the third issued instruction I3 when the second validity indicator OS1Cv is true.

The output control circuit 812 controls the second multiplexer 810 to output the first instruction of the second ordered set OS2A as the third issued instruction I3 when the first validity indicator OS1Bv is true, the second validity indicator OS1Cv is false, and the third validity indicator OS2Av is true.

The output control circuit 812 controls the second multiplexer 810 to output the second instruction of the second ordered set OS2B as the third issued instruction I3 when the first validity indicator OS1Bv is false, the second validity indicator OS1Cv is false, and the fourth validity indicator OS2Bv is true.

The output control circuit 812 controls the second multiplexer 810 to output the first instruction of the third ordered set OS2B as the third issued instruction I3 when the first validity indicator OS1Bv is false, the second validity indicator OS1Cv is false, and the fourth validity indicator OS2Bv is false, and the fifth validity indicator OS2ACv is true.

Further aspects of the present disclosure relate to one or more of the following clauses.

In an embodiment, a circuit comprises an instruction buffer including a plurality of entries. Each entry including an instruction, a validity indication, and at least one attribute. The circuit further comprises an instruction scheduling circuit to i) partition the plurality of entries into a plurality of first sets, ii) determine a plurality of second sets by reordering the respective entries of each first set according to the attributes of the respective entries, iii) determine a set ordering for the plurality of first sets according to a function of the attributes of the respective entries of each first set, and iv) select, based on the set ordering, a plurality of instructions from the plurality of second sets. The selected plurality of instructions are to be issued.

In an embodiment, a number of entries of a second set is less than or equal to a number of entries of a corresponding first set.

In an embodiment, the instruction scheduling circuit comprises an attribute function circuit to generate respective set metrics for the plurality of first sets according to the attributes of the respective entries of each first set, and a set ordering circuit to generate the set ordering according to the set metrics.

In an embodiment, the instruction scheduling circuit comprises an entry ordering circuit to reorder entries of a first set. The entry ordering circuit includes a plurality of comparators to generate respective outputs by comparing respective attributes of pairs of entries, a position determining circuit to determine respective position indicators of the entries according to the outputs of the plurality of comparators, and an output select circuit to output a second set. The second set includes the entries reordered according to the respective position indicators.

In an embodiment, a position indicator includes a one-hot indication of a position.

In an embodiment, the instruction scheduling circuit comprises a partial order combining circuit. The partial order combining circuit is to i) determine, using the set ordering, a first-ordered set of the plurality of second sets, ii) determine, using the set ordering, a second-ordered set of the plurality of second sets, iii) select as a first instruction to be issued an instruction of a first-ordered entry of the first-ordered set, iv) select as a second instruction to be issued an instruction of a second-ordered entry of the first-ordered set when a validity indication of the second-ordered entry of the first-ordered set indicates validity, and v) select as the second instruction to be issued an instruction of a first-ordered entry of the second-ordered set when the validity indication of the second-ordered entry of the first-ordered set indicates invalidity and a validity indication of the first-ordered entry of the second-ordered set indicates validity.

In an embodiment, the partial order combining circuit is further to i) determine, using the set ordering, a third-ordered set of the plurality of second sets, ii) select as a third instruction to be issued an instruction of a third-ordered entry of the first-ordered set when a validity indication of the third-ordered entry of the first-ordered set indicates validity, iii) select as the third instruction to be issued the instruction of the first-ordered entry of the second-ordered set when the validity indication of the second-ordered entry of the first-ordered set indicates validity, the validity indication of the third-ordered entry of the first-ordered set indicates invalidity, and the validity indication of the first-ordered entry of the second-ordered set indicates validity, iv) select as the third instruction to be issued an instruction of a second-ordered entry of the second-ordered set when the validity indication of the second-ordered entry of the first-ordered set indicates invalidity, the validity indication of the third-ordered entry of the first-ordered set indicates invalidity, and a validity indication of the second-ordered entry of the second-ordered set indicates validity, and v) select as the third instruction to be issued an instruction of a first-ordered entry of the third-ordered set when the validity indication of the second-ordered entry of the first-ordered set indicates invalidity, the validity indication of the third-ordered entry of the first-ordered set indicates invalidity, the validity indication of the second-ordered entry of the second-ordered set indicates invalidity, and a validity indication of the first-ordered entry of the third-ordered set indicates validity.

In an embodiment, an attribute of each of the entries respectively corresponds to a weight of the respective instructions of the entries. Each weight respectively corresponds to a latency of an operation performed by the respective instruction.

In an embodiment, an attribute of each of the entries corresponds to a respective age of the entry. The respective age corresponds to an amount of time the respective entry has been present in an instruction window.

In an embodiment, the circuit further comprising a processor. A number of first sets in the plurality of first sets is equal to an issue width of the processor.

In an embodiment, a method for selecting instructions to issue comprises i) receiving, by an instruction scheduling circuit, a plurality of entries, each entry including an instruction, a validity indication, and at least one attribute, ii) partitioning, by the instruction scheduling circuit, the plurality of entries into a plurality of first sets, iii) determining, by the instruction scheduling circuit, a plurality of second sets by reordering the respective entries of each first set according to the attributes of the respective entries, iv) determining, by the instruction scheduling circuit, a set ordering for the plurality of first sets according to a function of the attributes of the respective entries of each first set, and v) selecting, by the instruction scheduling circuit and based on the set ordering, a plurality of instructions from the plurality of second sets. The selected plurality of instructions are to be issued.

In an embodiment, a number of entries in a second set is less than or equal to a number of entries in a corresponding first set.

In an embodiment, generating the set ordering comprises determining a plurality of set metrics for the plurality of first sets, respectively, and generating the set ordering according to the plurality of set metrics.

In an embodiment, determining the plurality of set metrics includes determining each set metric according to a function of the attributes of the entries of the corresponding first set.

In an embodiment, reordering the respective entries of each first set includes generating a plurality of comparison results by performing a comparison of an attribute of each entry of the first set to a corresponding attribute of each other entry of the first set, and reordering the entries of the first set according to the plurality of comparison results.

In an embodiment, selecting the plurality of instructions to be issued includes i) determining, using the set ordering, a first-ordered set of the plurality of second sets, ii) determining, using the set ordering, a second-ordered set of the plurality of second sets, iii) selecting as a first instruction to be issued an instruction of a first-ordered entry of the first-ordered set, iv) selecting as a second instruction to be issued an instruction of a second-ordered entry of the first-ordered set when a validity indication of the second-ordered entry of the first-ordered set indicates validity, and v) selecting as the second instruction to be issued an instruction of a first-ordered entry of the second-ordered set when the validity indication of the second-ordered entry of the first-ordered set indicates invalidity and a validity indication of the first-ordered entry of the second-ordered set indicates validity.

In an embodiment, selecting the plurality of instructions to be issued further includes i) determining, using the set ordering, a third-ordered set of the plurality of second sets; selecting as a third instruction to be issued an instruction of a third-ordered entry of the first-ordered set when a validity indication of the third-ordered entry of the first-ordered set indicates validity, ii) selecting as the third instruction to be issued the instruction of the first-ordered entry of the second-ordered set when the validity indication of the second-ordered entry of the first-ordered set indicates validity, the validity indication of the third-ordered entry of the first-ordered set indicates invalidity, and the validity indication of the first-ordered entry of the second-ordered set indicates validity, iii) selecting as the third instruction to be issued an instruction of a second-ordered entry of the second-ordered set when the validity indication of the second-ordered entry of the first-ordered set indicates invalidity, the validity indication of the third-ordered entry of the first-ordered set indicates invalidity, and a validity indication of the second-ordered entry of the second-ordered set indicates validity, and iv) selecting as the third instruction to be issued an instruction of a first-ordered entry of the third-ordered set when the validity indication of the second-ordered entry of the first-ordered set indicates invalidity, the validity indication of the third-ordered entry of the first-ordered set indicates invalidity, the validity indication of the second-ordered entry of the second-ordered set indicates invalidity, and a validity indication of the first-ordered entry of the third-ordered set indicates validity.

In an embodiment, the at least one attribute of each of the entries includes a weight of the respective instructions of the entry. Each weight respectively corresponds to a latency of an operation performed by the respective instruction.

In an embodiment, the at least one attribute of each of the entries includes a respective age of the entry. The respective age corresponds to an amount of time the respective entry has been present in an instruction window.

In an embodiment, the method further comprises issuing the instructions to be issued to a processor. A number of first sets in the plurality of first sets is equal to an issue width of the processor.

Aspects of the present disclosure have been described in conjunction with the specific embodiments thereof that are proposed as examples. Numerous alternatives, modifications, and variations to the embodiments as set forth herein may be made without departing from the scope of the claims set forth below. Accordingly, embodiments as set forth herein are intended to be illustrative and not limiting.

What is claimed is:

1. A circuit comprising:
an instruction buffer including a plurality of entries, each entry including an instruction, a validity indication, and at least one respective attribute; and
an instruction scheduling circuit to:
partition the plurality of entries of the instruction buffer into a plurality of entry sets of respective entries, the plurality of entry sets including at least a first entry set and a second entry set;
determine a plurality of ordered entry sets by ordering the respective entries of each entry set of the plurality of entry sets according to the respective attributes of the entries of that entry set of the plurality of entry sets;
determine a set ordering for the plurality of ordered entry sets according to a function of the respective attributes of the respective entries of each ordered entry set; and
select, based on the set ordering for the plurality of ordered entry sets, a plurality of instructions from the plurality of ordered entry sets for issuance to a processor core,
wherein the instruction scheduling circuit comprises an entry ordering circuit to order entries of at least the first entry set of the plurality of entry sets the entry ordering circuit including:
a plurality of comparators to generate respective outputs by comparing, for at least a first pair of entries of the first entry set, the respective attribute of a first entry of the first pair of entries with the respective attribute of a second entry of the first pair of entries;
a position determining circuit to determine respective position indicators of the entries of the first entry set according to the respective outputs of the plurality of comparators; and
an output select circuit to output a re-ordered entry set, the re-ordered entry set including the entries of the first entry set that are re-ordered according to the respective position indicators.

2. The circuit of claim 1, wherein a number of entries of one of the ordered entry sets is less than or equal to a number of entries of a corresponding one of the entry sets.

3. The circuit of claim 1, wherein the instruction scheduling circuit further comprises:

an attribute function circuit to generate respective set metrics for the plurality of entry sets according to the respective attributes of the entries of each entry set; and
a set ordering circuit to generate the set ordering for the plurality of ordered entry sets according to the respective set metrics.

4. The circuit of claim 1, wherein at least one of the respective position indicators for the entries of the first entry set includes a one-hot indication of a position for that entry of the first entry set.

5. The circuit of claim 4, wherein the instruction scheduling circuit further comprises a partial order combining circuit configured to:
determine, using the set ordering for the plurality of ordered entry sets, a first-ordered entry set of the plurality of ordered entry sets;
determine, using the set ordering for the plurality of ordered entry sets, a second-ordered entry set of the plurality of ordered entry sets;
select, as a first instruction to be issued, an instruction of a first-ordered entry of the first-ordered entry set; and
select, as a second instruction to be issued, an instruction of a second-ordered entry of the first-ordered entry set when a validity indication of the second-ordered entry of the first-ordered entry set indicates validity; or
select, as the second instruction to be issued, an instruction of a first-ordered entry of the second-ordered entry set when (i) the validity indication of the second-ordered entry of the first-ordered entry set indicates invalidity and (ii) a validity indication of the first-ordered entry of the second-ordered entry set indicates validity.

6. The circuit of claim 5, the partial order combining circuit further configured to:
determine, using the set ordering for the plurality of entry sets, a third-ordered entry set of the plurality of ordered entry sets; and
select, as a third instruction to be issued, an instruction of a third-ordered entry of the first-ordered entry set when a validity indication of the third-ordered entry of the first-ordered entry set indicates validity; or
select, as the third instruction to be issued, the instruction of the first-ordered entry of the second-ordered entry set when (i) the validity indication of the second-ordered entry of the first-ordered entry set indicates validity, (ii) the validity indication of the third-ordered entry of the first-ordered entry set indicates invalidity, and (iii) the validity indication of the first-ordered entry of the second-ordered entry set indicates validity; or
select, as the third instruction to be issued, an instruction of a second-ordered entry of the second-ordered entry set when (i) the validity indication of the second-ordered entry of the first-ordered entry set indicates invalidity, and (ii) a validity indication of the second-ordered entry of the second-ordered entry set indicates validity; or
select, as the third instruction to be issued, an instruction of a first-ordered entry of the third-ordered entry set when (i) the validity indication of the second-ordered entry of the first-ordered entry set indicates invalidity, (ii) the validity indication of the second-ordered entry of the second-ordered entry set indicates invalidity, and (iii) a validity indication of the first-ordered entry of the third-ordered entry set indicates validity.

7. The circuit of claim 1, wherein for the plurality of entries, the at least one respective attribute of an entry corresponds to a weight of the instruction of the entry, the weight of the instruction corresponding to a latency of an operation performed by the instruction of the entry.

8. The circuit of claim 1, wherein for the plurality of entries, the at least one respective attribute of an entry corresponds to an age of the entry, the age of the entry corresponding to an amount of time the entry has been present in an instruction window associated with the instruction buffer.

9. The circuit of claim 1, wherein a number of entry sets in the plurality of entry sets is equal to an issue width of the processor core.

10. A method for selecting instructions to issue, the method comprising:
    receiving, by an instruction scheduling circuit, a plurality of entries, each entry including an instruction, a validity indication, and at least one respective attribute;
    partitioning, by the instruction scheduling circuit, the plurality of entries into a plurality of entry sets of respective entries;
    determining, by the instruction scheduling circuit, a plurality of ordered entry sets by ordering the respective entries of each entry set according to the respective attributes of the respective entries of the ordered entry set, wherein ordering the respective entries of an entry set includes:
        producing, via a plurality of comparators and for at least a first pair of entries of the entry set, a plurality of respective comparison results by comparing the respective attribute of a first entry of the first pair of entries with the respective attribute of a second entry of the first pair of entries;
        determining respective position indicators of the entries of the entry set according to the plurality of respective comparison results produced for at least the first pair of entries of the entry set; and
        producing a re-ordered entry set, the re-ordered entry set including the entries of the entry set that are re-ordered according to the respective position indicators;
    generating, by the instruction scheduling circuit, a set ordering for the plurality of entry sets according to a function of the respective attributes of the respective entries of each entry set; and
    selecting, by the instruction scheduling circuit and based on at least the set ordering, a plurality of instructions from the plurality of ordered entry sets for issuance to a processor core.

11. The method of claim 10, wherein a number of entries of one of the ordered entry sets is less than or equal to a number of entries of a corresponding one of the entry sets.

12. The method of claim 10, wherein generating the set ordering comprises:
    determining a plurality of respective set metrics for the plurality of ordered sets; and
    generating the set ordering for the plurality of entry sets according to the plurality of respective set metrics.

13. The method of claim 12, wherein determining the plurality of respective set metrics includes determining each set metric according to a function of the respective attributes of the entries of the corresponding entry set for which the set metric is determined.

14. The method of claim 10, wherein selecting the plurality of instructions to be issued includes:
    determining, using the set ordering for the plurality of entry sets, a first-ordered entry set of the plurality of ordered entry sets;
    determining, using the set ordering for the plurality of entry sets, a second-ordered entry set of the plurality of ordered entry sets;
    selecting, as a first instruction to be issued, an instruction of a first-ordered entry of the first-ordered entry set; and
    selecting, as a second instruction to be issued, an instruction of a second-ordered entry of the first-ordered entry set when a validity indication of the second-ordered entry of the first-ordered entry set indicates validity; or
    selecting, as the second instruction to be issued, an instruction of a first-ordered entry of the second-ordered entry set when (i) the validity indication of the second-ordered entry of the first-ordered entry set indicates invalidity and (ii) a validity indication of the first-ordered entry of the second-ordered entry set indicates validity.

15. The method of claim 14, wherein selecting the plurality of instructions to be issued further includes:
    determining, using the set ordering for the plurality of entry sets, a third-ordered entry set of the plurality of ordered entry sets; and
    selecting, as a third instruction to be issued, an instruction of a third-ordered entry of the first-ordered entry set when a validity indication of the third-ordered entry of the first-ordered entry set indicates validity; or
    selecting, as the third instruction to be issued, the instruction of the first-ordered entry of the second-ordered entry set when (i) the validity indication of the second-ordered entry of the first-ordered entry set indicates validity, (ii) the validity indication of the third-ordered entry of the first-ordered entry set indicates invalidity, and (iii) the validity indication of the first-ordered entry of the second-ordered entry set indicates validity; or
    selecting, as the third instruction to be issued, an instruction of a second-ordered entry of the second-ordered entry set when (i) the validity indication of the second-ordered entry of the first-ordered entry set indicates invalidity, and (ii) a validity indication of the second-ordered entry of the second-ordered entry set indicates validity; or
    selecting, as the third instruction to be issued, an instruction of a first-ordered entry of the third-ordered entry set when (i) the validity indication of the second-ordered entry of the first-ordered entry set indicates invalidity, (ii) the validity indication of the second-ordered entry of the second-ordered entry set indicates invalidity, and (iii) a validity indication of the first-ordered entry of the third-ordered entry set indicates validity.

16. The method of claim 10, wherein for the plurality of entries, the at least one respective attribute of an entry corresponds to a latency of an operation performed by the instruction of the entry.

17. The method of claim 10, wherein for the plurality of entries, the at least one respective attribute of an entry corresponds to an amount of time the entry has been present in an instruction window associated with an instruction buffer.

18. The method of claim 10, wherein a number of entry sets in the plurality of entry sets is equal to an issue width of the processor core.

19. A system-on-chip comprising:
a processor core to execute processor-executable instructions;
an instruction buffer including a plurality of entries, each entry including an instruction, a validity indication, and at least one respective attribute; and
an instruction scheduling circuit to:
partition the plurality of entries of the instruction buffer into a plurality of entry sets of respective entries, the plurality of entry sets including at least a first entry set and a second entry set;
determine a plurality of ordered entry sets by ordering the respective entries of each entry set of the plurality of entry sets according to the respective attributes of the entries of that entry set of the plurality of entry sets;
determine a set ordering for the plurality of ordered entry sets according to a function of the respective attributes of the respective entries of each ordered entry set; and
select, based on the set ordering for the plurality of ordered entry sets, a plurality of instructions from the plurality of ordered entry sets for issuance to the processor core,
wherein the instruction scheduling circuit comprises an entry ordering circuit to order entries of at least the first entry set of the plurality of entry sets, the entry ordering circuit including:
a plurality of comparators to generate respective outputs by comparing, for at least a first pair of entries of the first entry set, the respective attribute of a first entry of the first pair of entries with the respective attribute of a second entry of the first pair of entries;
a position determining circuit to determine respective position indicators of the entries of the first entry set according to the respective outputs of the plurality of comparators; and
an output select circuit to output a re-ordered entry set, the re-ordered entry set including the entries of the first entry set that are re-ordered according to the respective position indicators.

20. The system-on-chip of claim 19, wherein a number of entries of one of the ordered entry sets is less than or equal to a number of entries of a corresponding one of the entry sets.

* * * * *